US008620076B2

(12) United States Patent
Omori

(10) Patent No.: US 8,620,076 B2
(45) Date of Patent: Dec. 31, 2013

(54) REGION EXTRACTION APPARATUS AND REGION EXTRACTION METHOD

(75) Inventor: Yusuke Omori, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 961 days.

(21) Appl. No.: 12/712,465

(22) Filed: Feb. 25, 2010

(65) Prior Publication Data

US 2010/0226574 A1    Sep. 9, 2010

(30) Foreign Application Priority Data

Mar. 4, 2009 (JP) .................................. 2009-051139

(51) Int. Cl.
*G06K 9/34* (2006.01)
(52) U.S. Cl.
USPC ............................. 382/171; 382/170; 382/195
(58) Field of Classification Search
USPC .......................................................... 382/171
See application file for complete search history.

(56) References Cited

U.S. PATENT DOCUMENTS

| | | | | |
|---|---|---|---|---|
| 4,411,015 | A * | 10/1983 | Scherl et al. | 382/171 |
| 5,003,616 | A * | 3/1991 | Orita et al. | 382/282 |
| 5,068,788 | A * | 11/1991 | Goodenough et al. | 382/131 |
| 5,134,871 | A | 8/1992 | Makino et al. | |
| 5,150,421 | A * | 9/1992 | Morishita et al. | 382/169 |
| 5,832,111 | A * | 11/1998 | Florent | 382/171 |
| 5,845,009 | A * | 12/1998 | Marks et al. | 382/228 |
| 5,848,181 | A * | 12/1998 | Ogata | 382/169 |
| 5,862,249 | A * | 1/1999 | Jang et al. | 382/132 |
| 6,064,762 | A * | 5/2000 | Haenel | 382/171 |
| 6,195,457 | B1 * | 2/2001 | de Queiroz | 382/168 |
| 6,219,450 | B1 * | 4/2001 | de Queiroz | 382/199 |
| 6,256,416 | B1 * | 7/2001 | de Queiroz | 382/232 |
| 6,385,342 | B1 * | 5/2002 | de Queiroz | 382/233 |
| 6,453,069 | B1 * | 9/2002 | Matsugu et al. | 382/173 |
| 7,379,593 | B2 * | 5/2008 | Fan et al. | 382/173 |
| 7,391,895 | B2 * | 6/2008 | Wang et al. | 382/132 |
| 7,609,888 | B2 * | 10/2009 | Sun et al. | 382/173 |
| 7,676,081 | B2 | 3/2010 | Blake et al. | |

(Continued)

FOREIGN PATENT DOCUMENTS

| | | |
|---|---|---|
| JP | 4-5382 A | 1/1992 |
| JP | 7-41664 A | 10/1995 |

(Continued)

OTHER PUBLICATIONS

Ida, English translation of JP 2008102946.*

(Continued)

*Primary Examiner* — Gandhi Thirugnanam
(74) *Attorney, Agent, or Firm* — McGinn Intellectual Property Law Group, PLLC

(57) ABSTRACT

A region extraction apparatus includes an image acquisition device that acquires an image, a temporary initial region specifying device that specifies a plurality of temporary initial regions in the acquired image, a separation calculation device that calculates a separation that is an indicator indicating how much pixel values of all pixels of an inside of a specified temporary initial region and pixel values of all pixels of an outside of the specified temporary region are different from each other, on each temporary initial region, an initial region specifying device that specifies a temporary initial region having a highest calculated separation as an initial region, and a region extraction device that performs a region extraction on a basis of the specified initial region.

17 Claims, 12 Drawing Sheets

(56) References Cited

U.S. PATENT DOCUMENTS

| | | | |
|---|---|---|---|
| 7,705,908 B2 * | 4/2010 | Fredlund et al. | 348/349 |
| 8,103,093 B2 | 1/2012 | Blake et al. | |
| 2002/0097911 A1 * | 7/2002 | L. de Queiroz | 382/195 |
| 2003/0053692 A1 * | 3/2003 | Hong et al. | 382/171 |
| 2004/0017938 A1 * | 1/2004 | Cooper et al. | 382/171 |
| 2004/0042656 A1 * | 3/2004 | Timor et al. | 382/171 |
| 2004/0208364 A1 * | 10/2004 | Haque et al. | 382/171 |
| 2005/0107947 A1 * | 5/2005 | Han et al. | 701/207 |
| 2005/0117804 A1 | 6/2005 | Ida et al. | |
| 2006/0221090 A1 * | 10/2006 | Takeshima et al. | 345/582 |
| 2006/0285747 A1 | 12/2006 | Blake et al. | |
| 2007/0140571 A1 * | 6/2007 | Fan et al. | 382/232 |
| 2007/0237393 A1 * | 10/2007 | Zhang et al. | 382/173 |
| 2007/0280518 A1 * | 12/2007 | Nowinski et al. | 382/131 |
| 2008/0044080 A1 * | 2/2008 | Li | 382/155 |
| 2009/0003698 A1 * | 1/2009 | Milward et al. | 382/171 |
| 2010/0061631 A1 * | 3/2010 | Omori | 382/170 |
| 2010/0177234 A1 * | 7/2010 | Ogura et al. | 348/333.03 |
| 2010/0226574 A1 * | 9/2010 | Omori | 382/170 |
| 2012/0057783 A1 * | 3/2012 | Yamada | 382/165 |

FOREIGN PATENT DOCUMENTS

| | | | |
|---|---|---|---|
| JP | 10-320566 | A | 12/1998 |
| JP | 11-344310 | A | 12/1999 |
| JP | 2004-5383 | A | 1/2004 |
| JP | 2005-309772 | A | 11/2005 |
| JP | 2006-260401 | A | 9/2006 |
| JP | 2007-41664 | A | 2/2007 |
| JP | 2007-307358 | A | 11/2007 |
| JP | 2008-102946 | A | 5/2008 |
| JP | 2008102946 | A * | 5/2008 |
| JP | 2008-262560 | A | 10/2008 |
| JP | 2008-547097 | A | 12/2008 |

OTHER PUBLICATIONS

Notification of Reason(s) for Refusal dated Jun. 19, 2012, with English translation.

Decision of Rejection dated Oct. 19, 2012, with English translation.

* cited by examiner

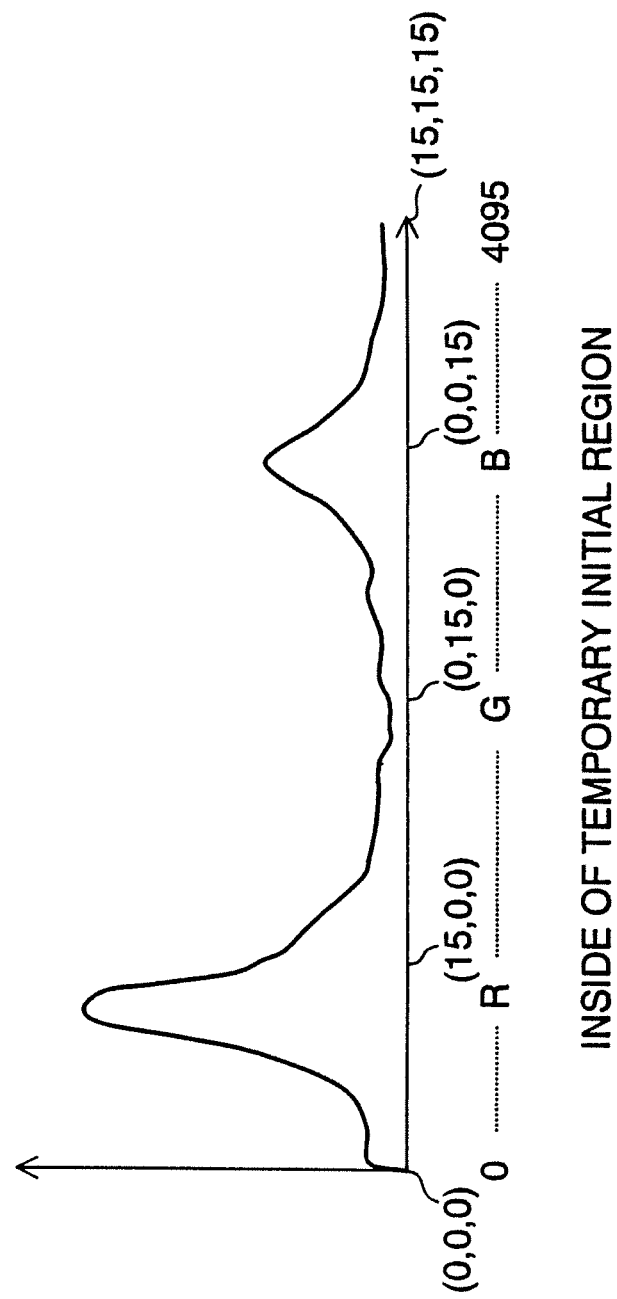

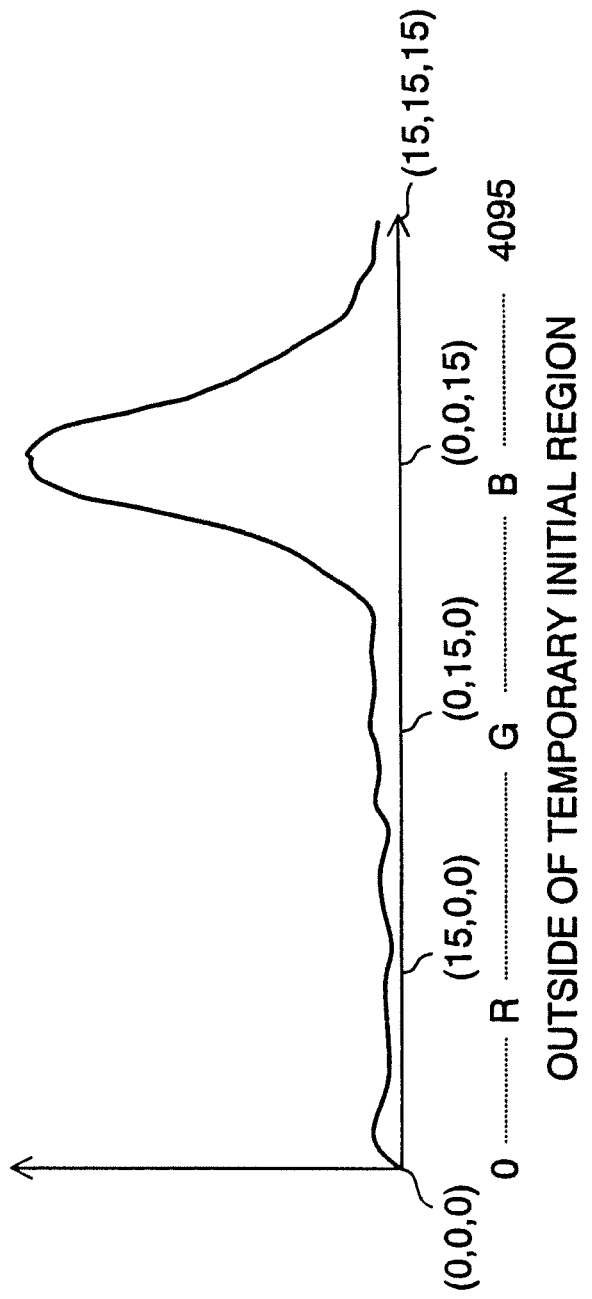

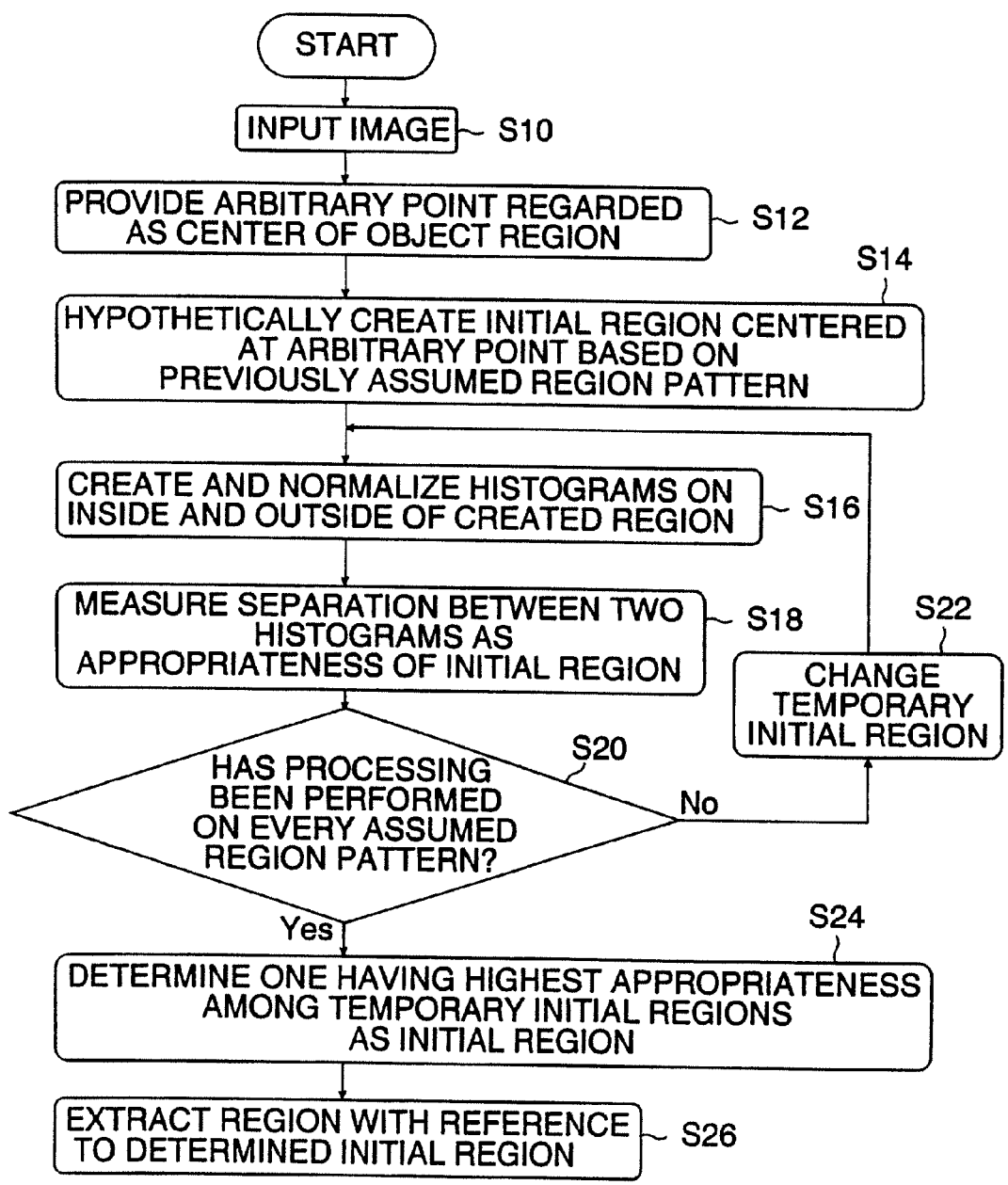

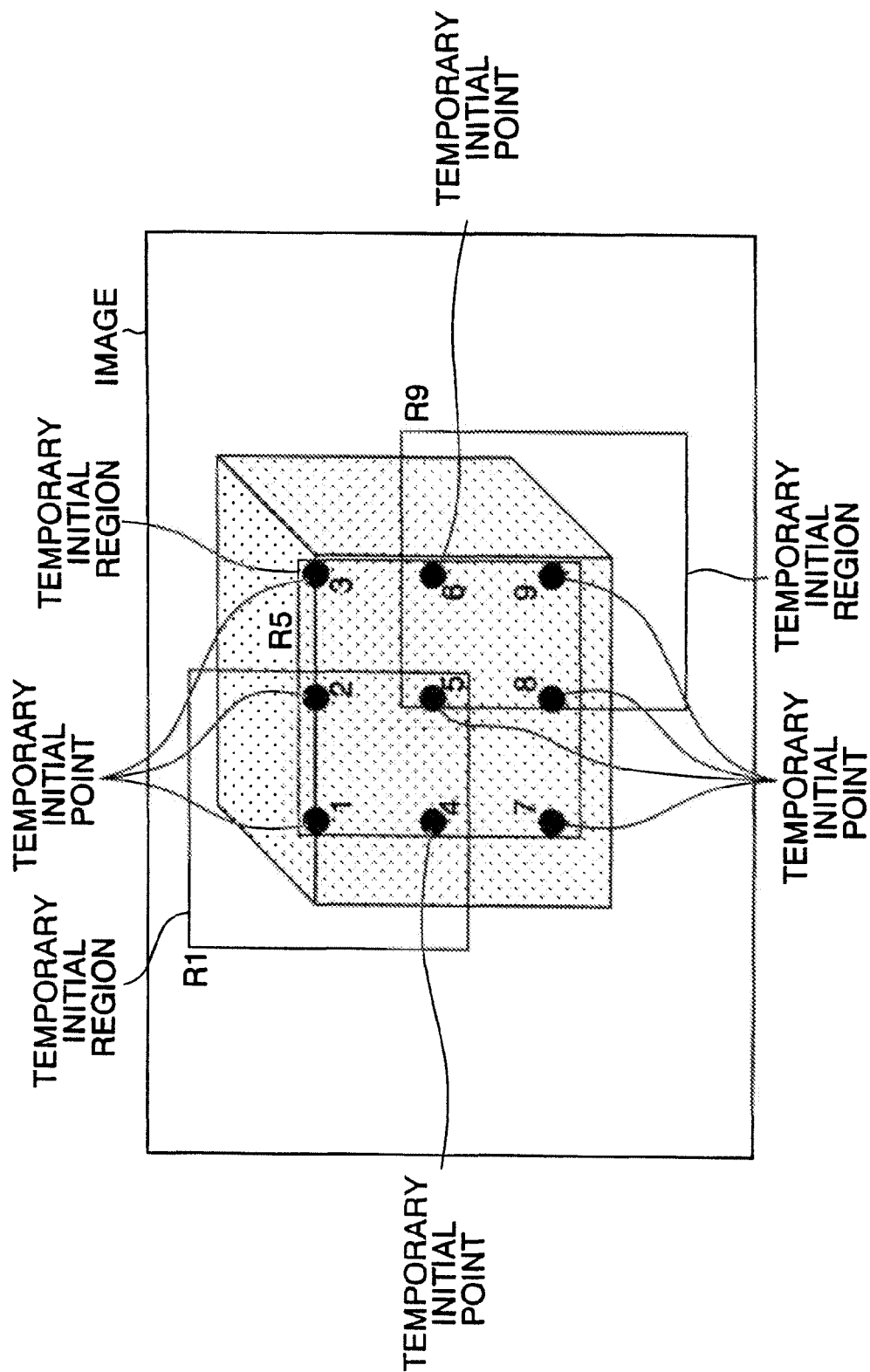

FIG.8A
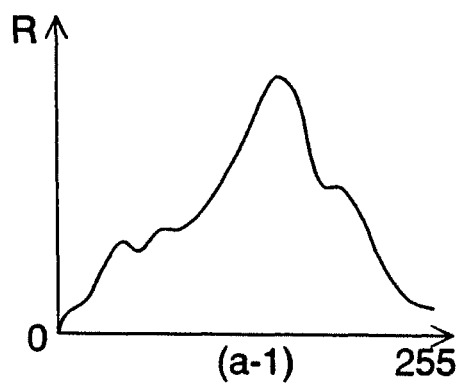
(a-1)
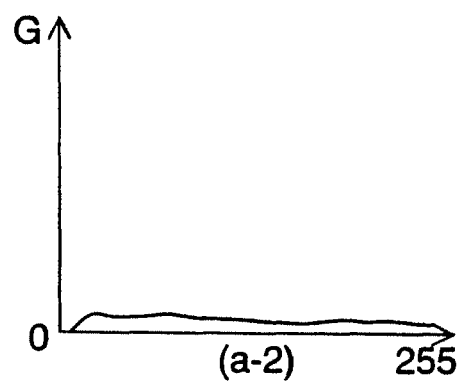
(a-2)
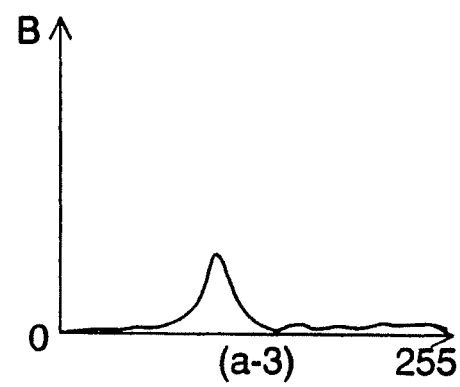
(a-3)
INSIDE OF TEMPORARY INITIAL REGION

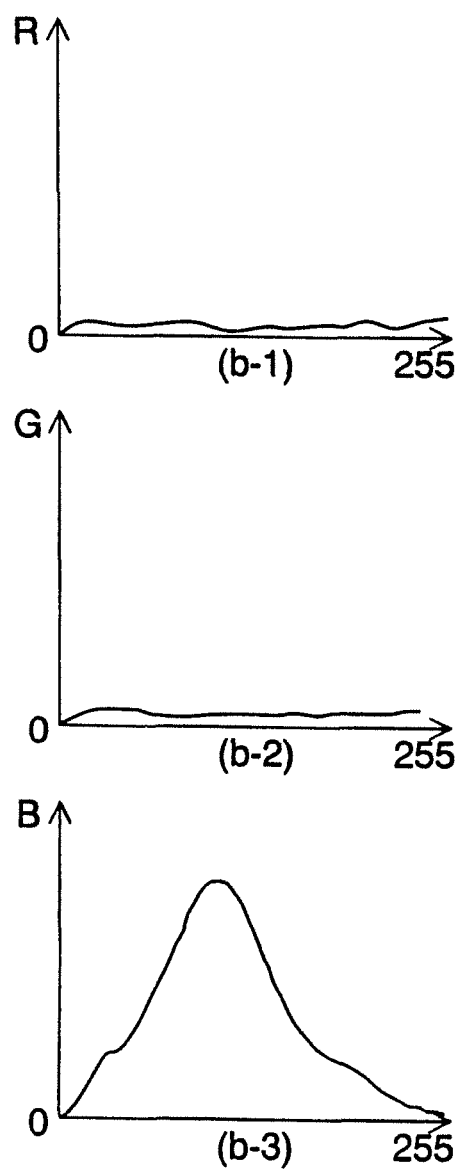

REGION EXTRACTION APPARATUS AND REGION EXTRACTION METHOD

BACKGROUND OF THE INVENTION

1. Field of the Invention

The present invention relates to a region extraction apparatus and a region extraction method, and more particularly to a region extraction apparatus and a region extraction method that extract a desired region on the basis of an initial region.

2. Description of the Related Art

Japanese Patent Application Laid-Open No. 10-320566 describes a method that extracts edge data from a main image including a subject and a sub-image excluding the subject, performs a threshold process on strength of difference of the edge data between the main image and the sub-image, calculates differential edge data, extracts contour outlines of the calculated differential edge data, joins the contour outlines to each other and extracts an initial region.

Japanese Patent Application Laid-Open No. 2004-005383 describes a method that detects a pixel having high frequency of appearance, extracts a region including a similar pixel from the vicinity and thereby extracts a region having a specified color (e.g., flesh color).

Japanese Patent Application Laid-Open No. 2007-041664 describes a method that extracts a group of pixels satisfying a prescribed condition (e.g., convexly formed) with respect to the magnitude or the distribution profile of smoothed pixel values as an initial region.

Extraction of a desired region is to determine whether each pixel belongs to the foreground or the background or to calculate a probability whether each pixel belongs to the foreground or the background.

All of Japanese Patent Applications Laid-Open Nos. 10-320566, 04-5382 and 07-41664 are methods for extracting a region accompanied by determination of the initial region. When it is determined whether each pixel belongs to the foreground or background, in a case where a method for extracting a region accompanied by the determination of the initial region is adopted, a determination of how to provide the initial region greatly exerts an influence.

For instance, the invention described in Japanese Patent Application Laid-Open No. 10-320566 has a problem that the desired region is unable to be extracted when an edge other than that of the desired region exists in the background image or near the desired region.

The invention described in Japanese Patent Application Laid-Open No. 04-5382 also has a problem that the desired region is unable to be extracted when the desired region does not have a pixel value of high frequency of appearance because what has high frequency of appearance does not necessarily fill the desired region.

The invention described in Japanese Patent Application Laid-Open No. 07-41664 has a problem that the desired region is unable to be extracted when a region where the distribution of pixels satisfies the prescribed condition is not the desired region.

SUMMARY OF THE INVENTION

The present invention is made in view of such situations, and has an object to provide a region extraction apparatus and a region extraction method that can correctly extract a desired region by locating a highly effective initial region.

A region extraction apparatus of a first aspect of the present invention comprises: an image acquisition device that acquires an image; a temporary initial region specifying device that specifies a plurality of temporary initial regions in the acquired image; a separation calculation device that calculates a separation that is an indicator indicating how much pixel values of all pixels of the inside of the specified temporary initial region and pixel values of all pixels of the outside of the region are different from each other, on each temporary initial region; an initial region specifying device that specifies the temporary initial region having the highest calculated separation as an initial region; and a region extraction device that performs a region extraction process on the basis of the specified initial region.

The region extraction apparatus of the first aspect acquires an image, specifies a plurality of temporary initial regions in the acquired image, calculates a separation that is an indicator indicating how much pixel values of all pixels of the inside of the specified temporary initial region and pixel values of all pixels of the outside of the region are different from each other, on each temporary initial region, specifies the temporary initial region having the highest calculated separation as an initial region and performs a region extraction process. Since the initial region can thus appropriately be specified, the region extraction can properly be performed.

The region extraction apparatus of a second aspect of the present invention is the region extraction apparatus according to the first aspect, further comprising a device that performs a process of blurring the entire image acquired, wherein the temporary initial region specifying device specifies a plurality of temporary initial regions in the image having been subjected to the process of blurring the entire image.

The region extraction apparatus of the second aspect performs a process of blurring the entire image acquired, and specifies a plurality of temporary initial regions in the image having been subjected to the process of blurring the entire image, thereby attaining the same advantageous effect as that where the temporary initial region is specified in a slightly larger fashion.

The region extraction apparatus of a third aspect of the present invention is the region extraction apparatus according to the first or second aspect, wherein the separation calculation device includes: a histogram generation device that generates a first normalized histogram whose abscissa represents the pixel values on the basis of the pixel values of all the pixels inside of the temporary initial region and a second normalized histogram whose abscissa represents the pixel values on the basis of the pixel values of all the pixels outside of the temporary initial region; and a device that calculates a total sum of absolute values of differences between the first and second normalized histograms on a pixel value basis, as the separation.

The region extraction apparatus of the third aspect generates the normalized histogram of the pixel values of all the pixels inside of the temporary initial region (the first normalized histogram) and the normalized histogram of the pixel values of all the pixels outside of the temporary initial region (the second normalized histogram), calculates the total sum of the absolute values of differences between the first and second normalized histograms on a pixel value basis as the separation, and thereby can specify the temporary initial region having the most varying pixel value distribution, or having the greatest difference between the foreground and the background, as the initial region.

The region extraction apparatus of a fourth aspect of the present invention is the region extraction apparatus according to the first or second aspect, wherein the separation calculation device includes: a device that creates probability distribution models of the pixel values of the inside and outside of the temporary initial region; and a device that calculates the separation between the probability distribution model of the inside of the temporary initial region and the probability distribution model of the outside of the region.

The region extraction apparatus of the fourth aspect creates the probability distribution models of the pixel values of the inside and outside of the temporary initial region, calculates the separation between the probability distribution models, and can thereby specify the temporary initial region having the highest separation, or having the most varying probability distribution, as the initial region.

The region extraction apparatus of a fifth aspect of the present invention is the region extraction apparatus according to any one of the first to fourth aspects, wherein the pixel value is a value in a prescribed color space such as an RGB color space and an HSV color space.

The region extraction apparatus of a sixth aspect of the present invention is the region extraction apparatus according to any one of the first to fifth aspects, wherein the temporary initial region specifying device includes: a point specifying device that specifies an arbitrary point in the acquired image; and a region specifying device that specifies a prescribed region centered at the specified arbitrary point as the temporary initial region.

The region extraction apparatus of a seventh aspect of the present invention is the region extraction apparatus according to the sixth aspect, wherein the point specifying device specifies a center of the acquired image as the arbitrary point.

The region extraction apparatus of the seventh aspect specifies the center of the image as the arbitrary point, specifies the prescribed region centered at the arbitrary point as the temporary initial region, and can thereby efficiently specify the temporary initial region when the extraction target is disposed at the center of the image.

The region extraction apparatus of an eighth aspect of the present invention is the region extraction apparatus according to the sixth aspect, further comprising: a device that detects an edge from the acquired image; and a device that calculates the barycenter of the detected edge, wherein the point specifying device specifies the barycenter of the calculated point group as the arbitrary point.

The region extraction apparatus of the eighth aspect detects an edge from the acquired image, specifies the barycenter of the edge as the arbitrary point, specifies the prescribed region centered at the arbitrary point as the temporary initial region, and can thereby efficiently specify the temporary initial region when there is no strong edge in the background.

The region extraction apparatus of a ninth aspect of the present invention is the region extraction apparatus according to any one of the sixth to eighth aspects, wherein the temporary initial region specifying device specifies rectangular regions or circular regions centered at the arbitrary point and varying in size as the plurality of the temporary initial regions.

The region extraction apparatus of the ninth aspect specifies the rectangular regions or the circular regions centered at the arbitrary point and varying in size as the plurality of the temporary initial regions, thereby allowing fast processing.

The region extraction apparatus of a tenth aspect of the present invention is the region extraction apparatus according to any one of the first to ninth aspects, wherein the region extraction device performs the region extraction using a graph cut algorithm.

A region extraction method of an eleventh aspect of the present invention comprises the steps of: a step of acquiring an image; a step of specifying a plurality of temporary initial regions in the acquired image; a step of calculating a separation that is an indicator indicating how much the inside and outside of the specified temporary initial region are different from each other, on each temporary initial region; a step of specifying the temporary initial region having the highest calculated separation as an initial region; and a step of performing a region extraction process on the basis of the specified initial region.

The region extraction method of a twelfth aspect of the present invention is the region extraction method according to the eleventh aspect, wherein the step of specifying the plurality of temporary initial regions includes: (1) a step of specifying an arbitrary point in the acquired image; (2) a step of specifying a prescribed region centered at the specified arbitrary point as the temporary initial region; and (3) a step of specifying a region centered at the specified arbitrary point and different in size from the prescribed region as the temporary initial region.

The region extraction method of the twelfth aspect can specify the plurality of regions centered at the arbitrary point and varying in size as the temporary initial region.

The region extraction method of a thirteenth aspect of the present invention is the region extraction method according to the twelfth aspect, wherein the step of specifying the plurality of temporary initial regions includes: (4) a step of changing the arbitrary point; and (5) a step of repeatedly performing the steps set forth in (2) to (4).

The region extraction method of the thirteenth aspect can specify a plurality of regions centered at the arbitrary point and varying in size as the temporary initial region on each of the plurality of the arbitrary points.

The region extraction method of a fourteenth aspect of the present invention is the region extraction method according to the twelfth aspect, further comprising between the step of acquiring the image and the step of specifying the plurality of temporary initial regions in the acquired image: (6) a step of specifying a plurality of points in the acquired image; (7) a step of specifying a prescribed region centered at the specified point as the temporary initial region on each of the plurality of points; and (8) a step of calculating the separation between the inside and outside of the temporary initial region on each temporary initial region specified on each of the plurality of points, wherein the step (1) regards a center point of the temporary initial region having the largest separation calculated in the step (8) as the arbitrary point.

The region extraction method of the fourteenth aspect specifies the plurality of points in the acquired image, specifies the prescribed region centered at the specified point as the temporary initial region on each of the plurality of points, calculates the separation between the inside and outside of the temporary initial region on each temporary initial region, acquires the temporary initial region having the largest separation, specifies the plurality of regions centered at the center point of this temporary initial region and varying in size as the temporary initial region, calculates the separation on each temporary initial region, specifies the temporary initial region having the highest calculated separation as the initial region and performs the region extraction process. This allows reliable detection of the most appropriate initial region.

A region extraction program of a fifteenth aspect of the present invention causes a processing device to execute the region extraction method according to any one of the eleventh to fourteenth aspects.

The present invention can correctly extract the desired region by locating a highly effective initial region.

BRIEF DESCRIPTION OF THE DRAWINGS

FIGS. 5A and 5B are diagrams showing histograms of pixel values in a case shown in FIG. 3, with FIG. 5A being the histogram of pixel values inside the temporary initial region, and FIG. 5B being the histogram of pixel values outside the temporary initial region;

FIG. 6 is a flowchart showing the processing flow of the region extraction apparatus 1;

FIG. 7 is a diagram illustrating the method for specifying the temporary initial point and the temporary initial region;

FIGS. 8A and 8B are diagrams showing histograms of pixel values in the case shown in FIG. 3, with FIG. 8A being the histogram of pixel values inside the temporary initial region, and FIG. 8B being the histogram of pixel values outside the temporary initial region.

DETAILED DESCRIPTION OF THE PREFERRED EMBODIMENT

<First Embodiment>

Figure 1:
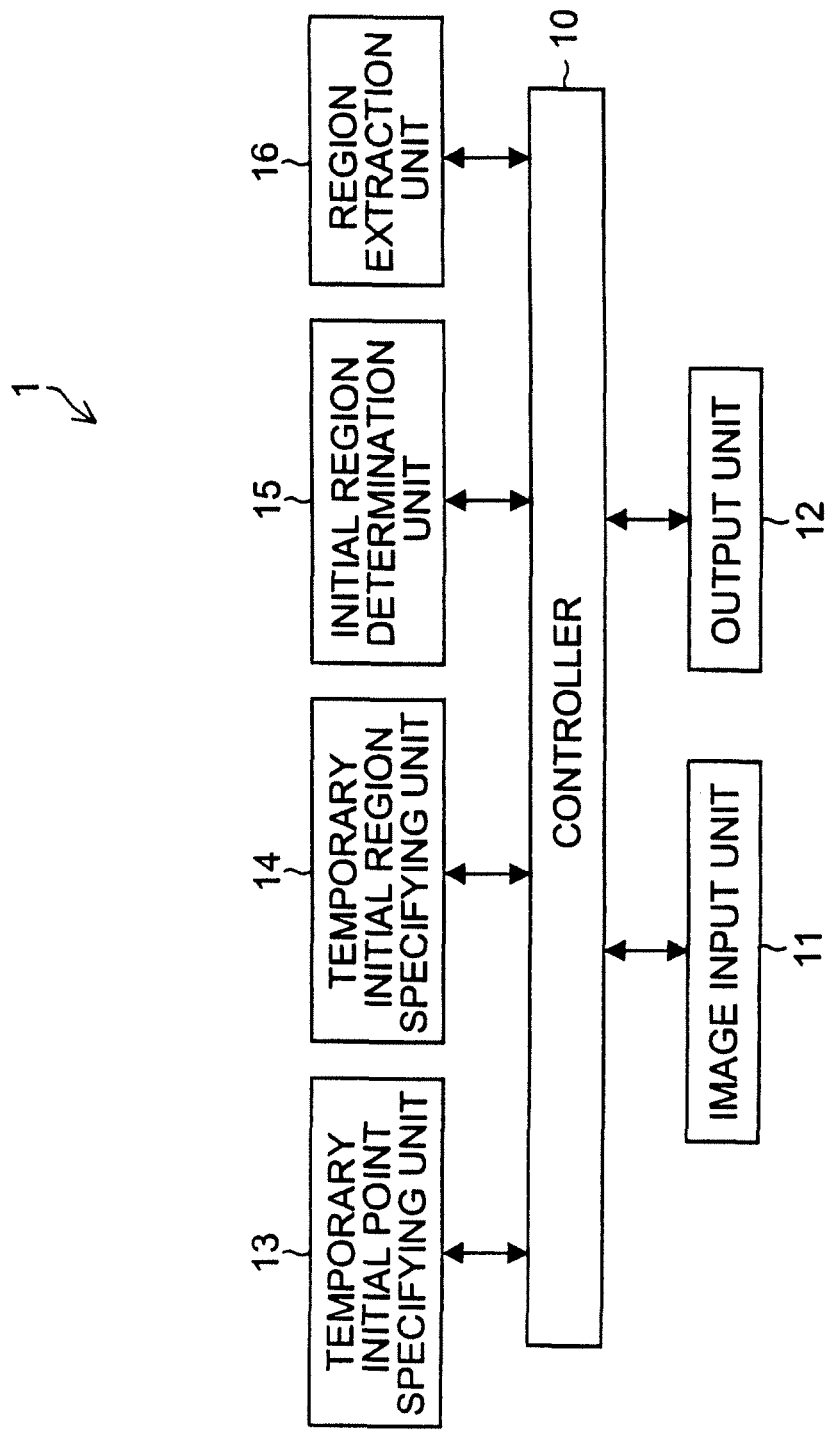
FIG. 1 is a schematic diagram showing a region extraction apparatus 1 of a first embodiment of the present invention.

FIG. 1 is a schematic diagram showing the entire configuration of a region extraction apparatus 1 according to a first embodiment. The region extraction apparatus 1 mainly comprises a controller 10, an image input unit 11, an output unit 12, a temporary initial point specifying unit 13, a temporary initial region specifying unit 14, an initial region determination unit 15 and a region extraction unit 16.

The controller 10 functions as a control device controlling the entire operation of the region extraction apparatus I in a centralized fashion, and as a processing device performing various arithmetic processes. The controller 10 includes a memory region. There is stored firmware and the like, that is a control program executed by the controller 10, in the memory region.

The image input unit 11 acquires via an interface (not shown) an image stored in an external device such as a digital camera, a PC and mobile devices or a storage medium, and inputs the image to the controller 10.

The output unit 12 outputs an image of the desired region having been extracted by the region extraction unit 16 to the external device and the like.

Figure 2:
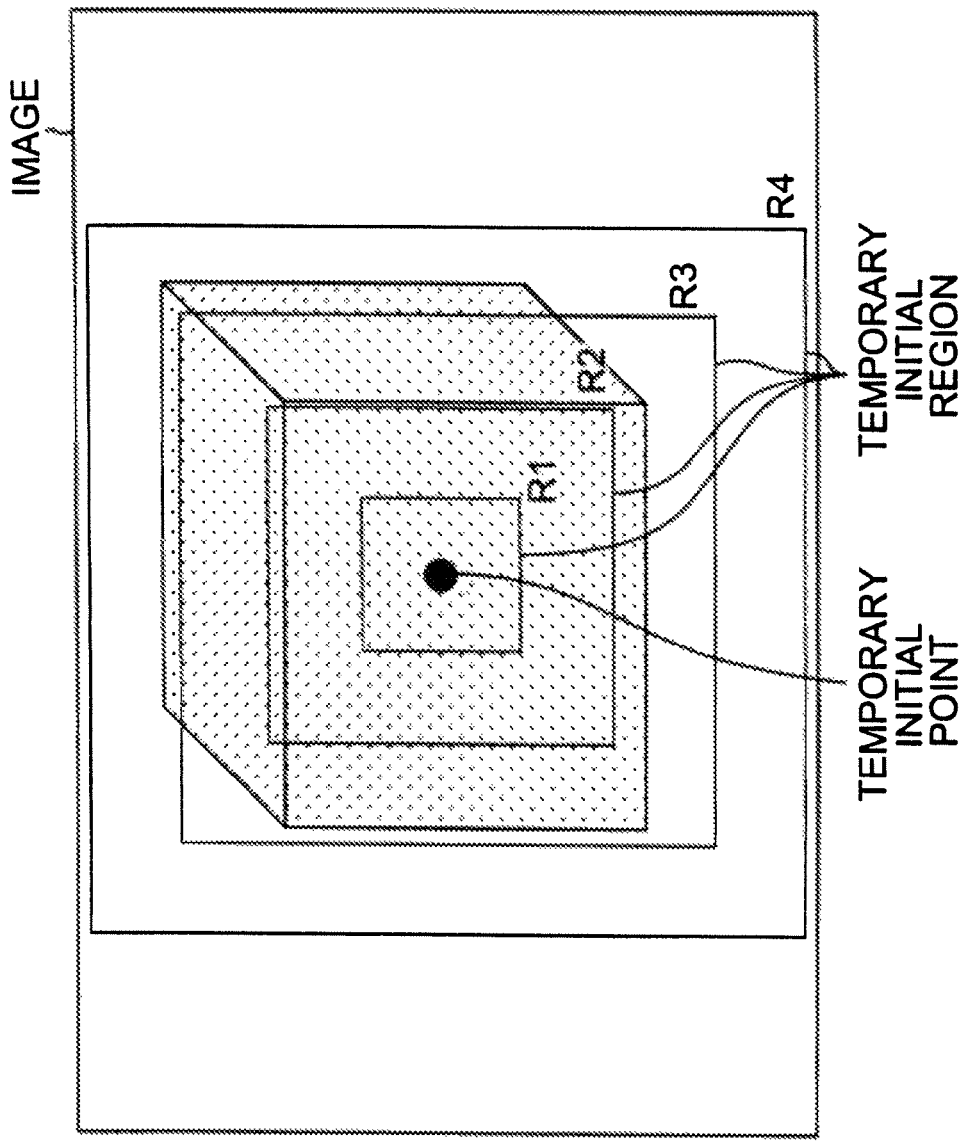
FIG. 2 is a diagram illustrating a method for specifying a temporary initial point and a temporary initial region.

The temporary initial point specifying unit 13 specifies an arbitrary point in the image inputted by the image input unit 11 via the controller 10 as a temporary initial point. In this embodiment, the temporary initial point is specified on a position assumed as the center of the imaged subject (object) in the inputted image as shown in FIG. 2. Following two methods can mainly be considered as a method for calculating the position assumed as the center of the object. However, another method publicly known as a method for estimating a position of an object to a certain extent can be adopted instead.

(1) A method which assumes that an object is positioned at the center of an image and assumes a point whose coordinates correspond to the center of the image as the center of the object. This method is effective when an extraction target such as an item image (an image where only the item for sale is taken) is positioned at the center of the image.

(2) A method which considers a location where a lot of edges concentrate as a location where an object exists, detects edges having an intensity more than or equal to a prescribed threshold, regards the detected edges as a point group, and assumes the barycenter of the point group as the center of the object. This method is effective when the background does not include a strong edge.

The temporary initial region specifying unit 14 specifies a region centered at the temporary initial point specified by the temporary initial point specifying unit 13, as a temporary initial region. In this embodiment, a plurality of temporary initial regions R1, R2, R3 and R4 centered at the temporary initial point and varying in size as exemplified in FIG. 2 are specified. The speed of processing can be enhanced by thus simplifying the shape of the temporary initial region. Although an example where a quadrilateral region is specified as the temporary initial region is shown in FIG. 2, a temporary initial region such as a polygon other than a quadrilateral, a circle, an ellipse and the like can be specified. For instance, in a case of a circle, variation in radius can specify a plurality of temporary initial regions varying in size. Capability of fast processing also holds in the case other than the quadrilateral, identically to a case of quadrilateral.

The initial region determination unit 15 determines the most appropriate temporary initial region as the initial region from among a plurality of temporary initial regions specified by the temporary initial region specifying unit 14. A basic idea to determine the initial region is to repeats confirmation of whether the plurality of temporary initial regions hypothetically specified by the temporary initial region specifying unit 14 is appropriate as an initial region or not on each temporary initial region, and to select the most appropriate temporary initial region as the initial region.

In this embodiment, the initial region determination unit 15 calculates a separation on each temporary initial region, and confirms whether the temporary initial region is appropriate as the initial region or not on the basis of the separation. A method for calculating the separation will be described with reference to FIG. 3.

Figure 3:
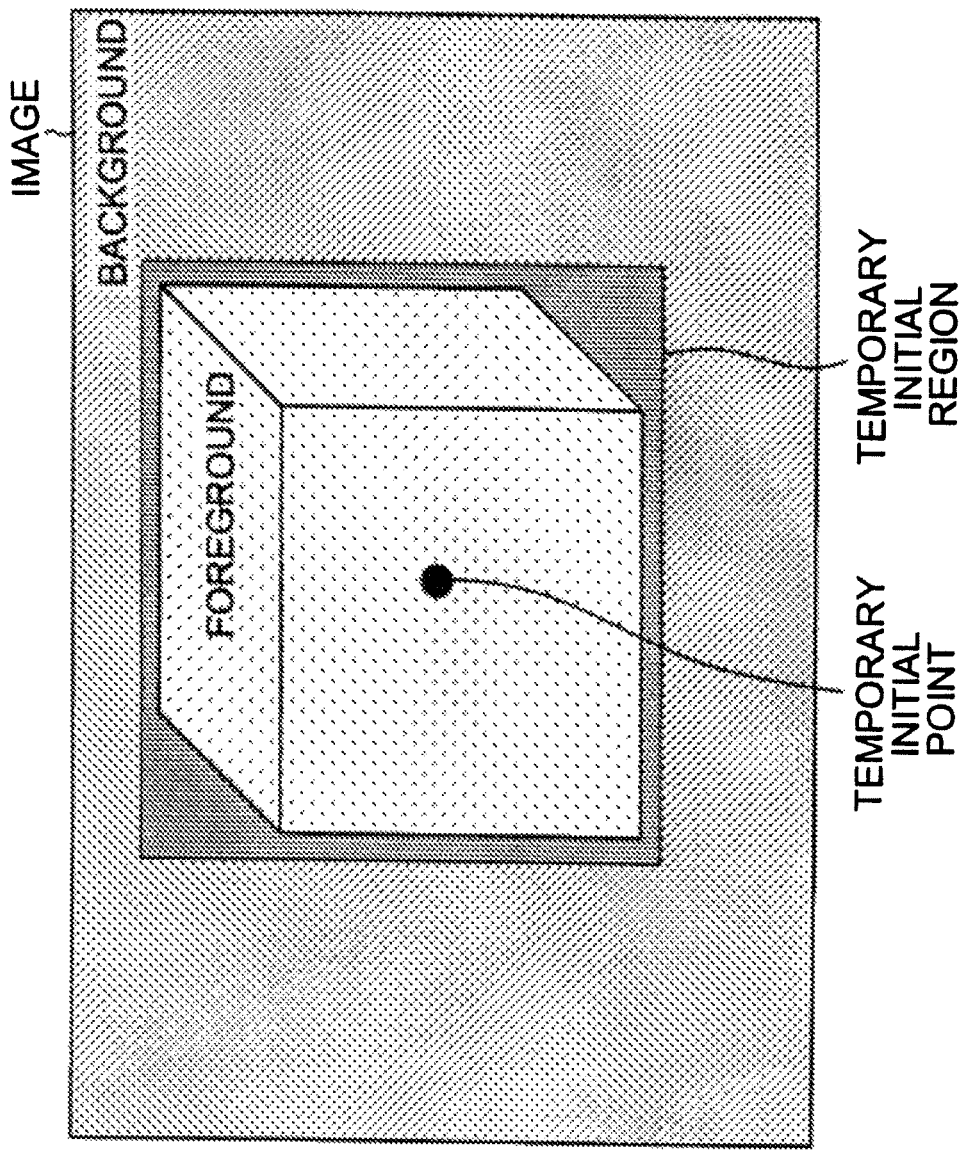
FIG. 3 is a diagram showing relationship between an image, the temporary initial point and the temporary initial region.
Figure 4:
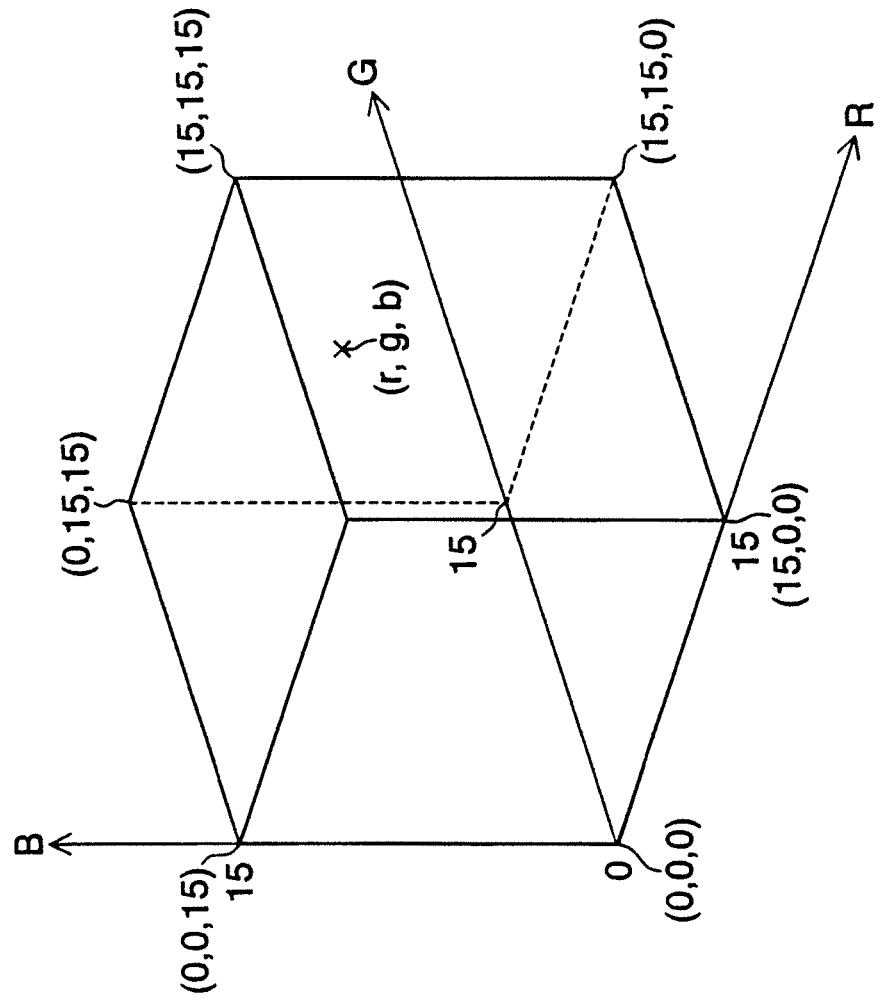
FIG. 4 is a diagram showing a pixel value.

FIG. 3 shows an image where a red cubic object (actual foreground) is imaged at substantially center of the image, and a background part (a part where nothing is imaged) is blue. Since FIG. 3 shows a color image, each pixel in FIG. 3 has pixel values on R, G and B each having 256-step gradation from 0 to 255. Accordingly, the pixel value of each pixel is represented as a point (r, g, b) on three-dimensional coordinates of R, G and B where the 256-step gradation is compressed to 1/16, 16-step gradation (r: pixel value of R, g: pixel value of G, b: pixel value of B, $0 \le r, g, b \le 15$), as shown in FIG. 4.

Since FIG. 3 shows an item image, the temporary initial point specifying unit 13 specifies the temporary initial point at the substantially center of the image, and the temporary initial region specifying unit 14 specifies the temporary initial region, which is a prescribed-sized quadrilateral. As shown in FIG. 5, a histogram is created whose abscissa indicates the pixel values (although a histogram is typically represented as a bar graph where bars proportional in area to the frequency of appearance with respect to each value are arranged, the histogram is represented as a curve connecting the tips of the bars in this embodiment), if the inside of the temporary initial region is regarded as the foreground, the outside of the temporary initial region is regarded as the background, and the pixel value (r, g, b) of each pixel is plotted on a one-dimensional coordinate where (0, 0, 0) corresponds to 0, (15, 0, 0) corresponds to around 15, (0, 15, 0) corresponds to around 2048, (0, 0, 15) corresponds to around 3410 and (15, 15, 15) corresponds to 4095, with respect to each of the region regarded as the foreground and the region regarded as the background.

In the example shown in FIG. 3, the region regarded as the foreground comprises an object and a part of the background. Accordingly, in the histogram of the foreground shown in FIG. 5A, a high peak appears around 15 representing R and a low peak appears around 3410 representing B. On the other hand, the region regarded as the background is composed of the background. Accordingly, in the histogram of the background shown in FIG. 5B, a high peak appears around 3410 representing B.

After the histograms of the region regarded as the foreground and the region regarded as the background are created, each histogram is normalized. A difference between the frequency of appearance of the normalized histogram on the region regarded as the foreground and the frequency of appearance of the normalized histogram on the region regarded as the background is calculated with respect to each of pixel values of 0 to 4095, and the total sum of the absolute values of the differences is acquired. Since the difference between the frequencies of appearance is calculated after the normalization of the histograms, the total sum is calculated as a value from 0 to 1. The total sum is a value representing the separation between the foreground and the background. The separation value of 0 indicates agreement between the region regarded as the foreground and the region regarded as the background. The nearer the separation approaches 1, the more the region regarded as the foreground and the region regarded as the background differ from each other.

The initial region determination unit 15 regards the temporary initial region having the largest separation, which has been acquired on each temporary initial region basis, as the most appropriate temporary initial region, and determines the region as the initial region.

The region extraction unit 16 extracts a region using the initial region determined by the initial region determination unit 15. A graph cut algorithm as described in Japanese Patent Application Laid-Open No. 2007-307358 and other segmentation method can be utilized as a method for extracting a region.

An operation of the such configured region extraction apparatus 1 will be described. FIG. 6 is a flowchart showing a processing flow of the region extraction apparatus 1.

The image input unit 11 acquires an image from an external devices and the like, and inputs the image to the controller 10 (step S10). The controller 10 inputs the image to the temporary initial point specifying unit 13, and the temporary initial point specifying unit 13 specifies the temporary initial point at a position assumed as the center of the imaged object in the inputted image (step S12). The controller 10 acquires the image where the temporary initial point is specified by the temporary initial point specifying unit 13, and inputs the image to the temporary initial region specifying unit 14. The temporary initial region specifying unit 14 specifies a plurality of temporary initial regions centered at the temporary initial point specified in step S11 (step S14). Since the cubic object has been imaged in this embodiment, a previously assumed region pattern, that is, a plurality of temporary initial regions varying in quadrilateral size, is specified.

The controller 10 acquires the image where the plurality of temporary initial regions is specified by the temporary initial region specifying unit 14, and inputs the image to the initial region determination unit 15. The initial region determination unit 15 selects a desired temporary initial region from among the plurality of temporary initial regions specified in step S12, generates respective histograms on the foreground and the background of the selected temporary initial region, and normalizes the histograms (step S16). The initial region determination unit 15 calculates the separation on the basis of the normalized histograms (step S18).

The controller 10 determines whether the separation is calculated with respect to every temporary initial region specified in step S14 or not (step S20).

When the separations have been calculated on not all of the temporary initial regions specified in step S14 yet (NO in step S20), the controller 10 selects afresh a temporary initial region whose separation has not been calculated yet (step S22), the temporary region determination unit 15 performs generation and normalization of histograms on the foreground and the background of the temporary initial region selected anew (the separation has not been calculated yet) (step S16), and calculates the separation (step S18).

When the separations have already been calculated on all of the temporary initial regions specified in step S14 (YES in step S20), the initial region determination unit 15 determines one of the plurality of the temporary initial regions specified in step S12 whose appropriateness is the highest as the initial region (step S24). More specifically, the initial region determination unit 15 determines the temporary initial region whose separation has been calculated to be of the highest value among the separations calculated in step S18 on all the temporary initial regions as the initial region.

The controller 10 inputs the initial region determined in step S24 to the region extraction unit 16, and the region extraction unit 16 extracts a region using this initial region (step S26).

According to this embodiment, the most appropriate initial region is determined from among the specified plurality of the temporary initial regions. Therefore, an initial condition which is advantageous to operation of a region extraction algorithm, or an appropriate initial condition, can be specified. This can obviate a problem that the region extraction is unable to be performed properly because the initial region is unable to be appropriately specified. Thus, this also obviates occurrence of a problem of expending an effort such as manually specifying the initial region.

Moreover according to this embodiment, the separation is calculated while regarding the inside of the temporary initial region as the foreground and regarding the outside of the temporary initial region as the background. Therefore, it can reliably be determined whether the temporary initial region is the initial region which effectively separates the foreground (object) and the background from each other or not.

According to this embodiment, the plurality of the temporary initial regions are specified in the inputted image. Instead, the entire inputted image may be blurred, and the temporary initial region may be specified in the blurred image. This attains an effective advantage similar to that of a case where the temporary initial region is slightly widened.

According to this embodiment, an arbitrary point in the image is specified as the temporary initial point, and a plurality of temporary initial regions centered at the arbitrary point and varying in size is specified. However, the method for specifying the temporary initial point and the temporary initial regions is not limited thereto only if a plurality of different temporary initial regions is specified. As shown in FIG. 7, a plurality of temporary initial points (the number of points is not limited to nine) may be specified, and temporary initial regions centered at the temporary initial points and being of the same size may be specified at respective temporary initial points.

The method for specifying temporary initial region shown in FIG. 2 and the method for specifying temporary initial region shown in FIG. 7 may be combined. For instance, first of all, the plurality of temporary initial points is specified, the temporary initial regions centered at the temporary initial points and being of the same size are specified at the respective temporary initial points, and the separation is calculated on each temporary initial region, as shown in FIG. 7. Subsequently, a plurality of temporary initial regions varying in size may be specified centered at the temporary initial point at the center of the temporary initial region having the largest separation, as shown in FIG. 2. A plurality of temporary initial regions varying in size may also be specified on the plurality of temporary initial points, respectively.

In this embodiment, the one-dimensional histogram is generated as shown in FIG. 5. Instead, different histograms may be generated on the respective colors. FIG. 8 is histograms of the inside and outside of a temporary initial region on each of R, G and B, when the background part (a part where nothing is imaged) is blue, the temporary initial point is specified at the substantially center of an image where a red cubic object (actual foreground) is taken substantially centered at the image and the quadrilateral temporary initial region is specified including the cubic object as shown in FIG. 3. In this case, each of the histograms of the inside and outside of the temporary initial region is normalized such that the sum of the frequencies of appearance of R, G and B becomes one. The total sum of the differences of frequencies of appearance of the normalized histograms on the values from 0 to 255 may be calculated on each color of R, G and B. A value of the entire amount of the total sums of the differences of frequencies of appearance calculated on respective colors of R, G and B may be calculated as the separation.

According to this embodiment, the histogram is generated using all the pixel values from 0 to 255. For instance, a histogram may be generated using alternate pixel values (e.g., only pixel values 0, 2, 4, . . . ) instead. This allows the processing to be performed faster.

Although the histogram is generated using the R, G and B pixel values in this embodiment, it is not limited to the R, G and B pixel values. Instead, HSV pixel values may be used.

This embodiment has been described with the example of the color image. Instead, the present invention can be applied using brightness values as the pixel values in a case of a monochrome (gray scale) image (e.g., an image taken by flash photography at night).

Figure 9A:
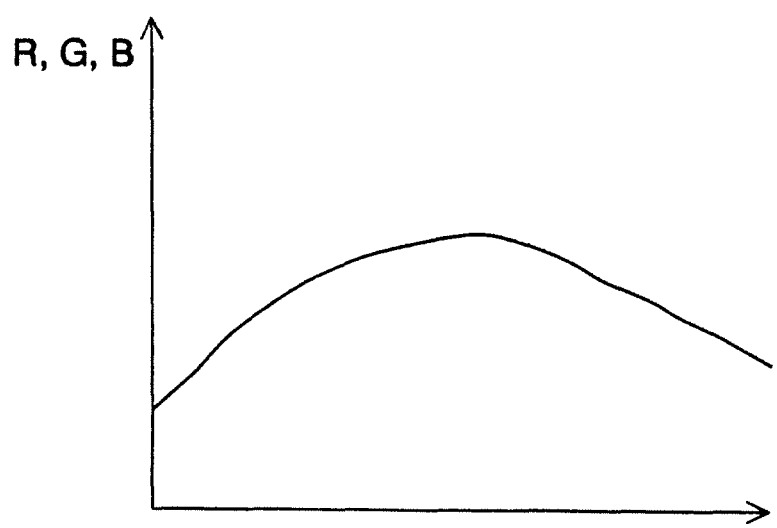
FIGS. 9A and 9B are examples of the histograms.
Figure 9B:
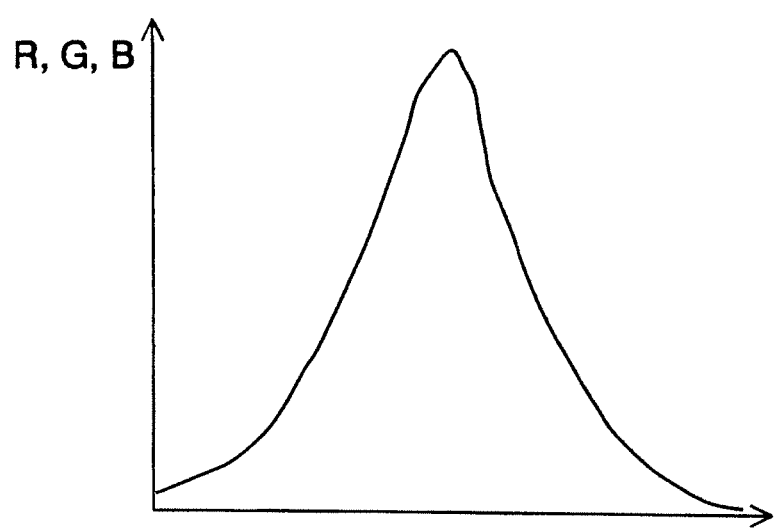

According to this embodiment, the normalized histogram is used only for calculating the separation. Instead, information on the profile of the normalized histogram may be used. When an image to be a target is for instance an image of the natural world such as a flower, a histogram having smooth profile is generated as shown in FIG. 9A. When an image to be a target is artificial image such as animation, a histogram having steep profile is generated as shown in FIG. 9B. Accordingly, when a histogram having a steep profile is generated even though an image of the natural world is analyzed, it can be determined as an error, thereby reducing false determinations.

Although the separation is calculated on the basis of the normalized histogram in this embodiment, the method for calculating the separation is not limited thereto. For instance, probability distribution models may be created on pixel values of the inside and outside of the temporary initial region, respectively, and the separation is calculated on the basis of the models instead. Although for instance a Gaussian mixing distribution model can be used as the probability distribution models, it is not limited to this method. Various methods publicly known as a method for calculating a distance between probability distribution models can be used as a method for calculating the separation between probability distribution models.

The present invention may be provided as a device such as a digital camera, a PC and mobile devices, or provided as a system including a server and a terminal. It is not limited to the device or the system, but may be provided as a program to be applied to the device and the system.

What is claimed is:

1. A region extraction apparatus, comprising:
    an image acquisition device that acquires an image;
    a temporary initial region specifying device that specifies a plurality of temporary initial regions in the acquired image;
    a separation calculation device that calculates a separation that is an indicator indicating how much pixel values of all pixels of an inside of a specified temporary initial region and pixel values of all pixels of an outside of the specified temporary region are different from each other, on each temporary initial region;
    an initial region specifying device that specifies a temporary initial region having a highest calculated separation as an initial region; and
    a region extraction device that performs a region extraction on a basis of the specified initial region,
    wherein the separation calculation device includes:
        a histogram generation device that generates a first normalized histogram whose abscissa represents pixel values on a basis of the pixel values of all the pixels inside of the specified temporary region and a second normalized histogram whose abscissa represents pixel values on a basis of the pixel values of all the pixels outside of the specified temporary initial region; and
        a device that calculates a total sum of absolute values of differences between the first and second normalized histograms on a pixel value basis, as the separation.

2. The region extraction apparatus according to claim 1, further comprising:
    a device that performs a blurring of image acquired,
    wherein the temporary initial region specifying device specifies the plurality of temporary initial regions in an image subjected to the blurring of the image.

3. The region extraction apparatus according to claim 1, wherein the separation calculation device further includes:
    a device that creates probability distribution models of the pixel values of the inside and outside of the temporary initial region; and
    a device that calculates the separation between the probability distribution model of the inside of the temporary initial region and the probability distribution model of the outside of the region.

4. The region extraction apparatus according to claim 1, wherein the pixel value comprises a value in an RGB color space or an HSV color space.

5. The region extraction apparatus according to claim 1, wherein the temporary initial region specifying device includes:
    a point specifying device that specifies an arbitrary point in the acquired image; and
    a region specifying device that specifies a prescribed region centered at the specified arbitrary point as the temporary initial region.

6. The region extraction apparatus according to claim 5, wherein the point specifying device specifies a center of the acquired image as the arbitrary point.

7. The region extraction apparatus according to claim 5, further comprising:
    a device that detects an edge from the acquired image; and
    a device that calculates a barycenter of the detected edge, wherein the point specifying device specifies a barycenter of a calculated point group as the arbitrary point.

8. The region extraction apparatus according to claim 5, wherein the temporary initial region specifying device specifies rectangular regions or circular regions centered at the arbitrary point and varying in size as the plurality of the temporary initial regions.

9. The region extraction apparatus according to claim 1, wherein the region extraction device performs the region extraction using a graph cut algorithm.

10. A region extraction method, comprising:
acquiring an image;
specifying a plurality of temporary initial regions in the acquired image;
calculating a separation that is an indicator indicating how much an inside and an outside of a specified temporary initial region are different from each other, on each temporary initial region;
specifying a temporary initial region having a highest calculated separation as an initial region; and
performing a region extraction on a basis of the specified initial region,
wherein the calculating of the separation includes:
generating a first normalized histogram whose abscissa represents the pixel values on a basis of pixel values of all the pixels inside of the specified temporary initial region and a second normalized histogram whose abscissa represents pixel values on a basis of the pixel values of all the pixels outside of the specified temporary initial region; and
calculating a total sum of absolute values of differences between the first and second normalized histograms on a pixel value basis, as the separation.

11. The region extraction method according to claim 10, wherein the specifying the plurality of temporary initial regions includes:
specifying an arbitrary point in the acquired image;
specifying a prescribed region centered at the specified arbitrary point as the temporary initial region; and
specifying a region centered at the specified arbitrary point and different in size from the prescribed region as the temporary initial region.

12. The region extraction method according to claim 11, wherein the specifying the plurality of temporary initial regions further includes:
changing the arbitrary point; and
repeatedly performing the specifying the prescribed region, the specifying the region, and the changing the arbitrary point.

13. The region extraction method according to claim 11, further comprising, between the acquiring the image and the specifying the plurality of temporary initial regions in the acquired image:
specifying a plurality of points in the acquired image;
specifying a prescribed region centered at the specified point as the temporary initial region on each of the plurality of points; and
calculating the separation between the inside and the outside of the temporary initial region on each temporary initial region specified on each of the plurality of points,
wherein the specifying an arbitrary point regards a center point of the temporary initial region having a largest separation calculated in the calculating the separation between the inside and the outside of the temporary initial region as the arbitrary point.

14. A non-transitory computer readable storage medium tangibly embodying a program of machine-readable instructions executable by a digital processing apparatus to perform a region extraction method, the method comprising:
acquiring an image;
specifying a plurality of temporary initial regions in the acquired image;
calculating a separation that is an indicator indicating how much an inside and an outside of a specified temporary initial region are different from each other, on each temporary initial region;
specifying a temporary initial region having a highest calculated separation as an initial region; and
performing a region extraction on a basis of the specified initial region,
wherein the calculating of the separation includes:
generating a first normalized histogram whose abscissa represents pixel values on a basis of the pixel values of all the pixels inside of the specified temporary initial region and a second normalized histogram whose abscissa represents pixel values on a basis of the pixel values of all the pixels outside of the specified temporary initial region; and
calculating a total sum of absolute values of differences between the first and second normalized histograms on a pixel value basis, as the separation.

15. The non-transitory computer readable storage medium tangibly embodying the program of machine-readable instructions executable by the digital processing apparatus to perform the region extraction method according to claim 14, wherein the specifying the plurality of temporary initial regions includes:
specifying an arbitrary point in the acquired image;
specifying a prescribed region centered at the specified arbitrary point as the temporary initial region; and
specifying a region centered at the specified arbitrary point and different in size from the prescribed region as the temporary initial region.

16. The non-transitory computer readable storage medium tangibly embodying the program of machine-readable instructions executable by the digital processing apparatus to perform the region extraction method according to claim 15, wherein the specifying the plurality of temporary initial regions further includes:
changing the arbitrary point; and
repeatedly performing the specifying the prescribed region, the specifying a region, and the changing the arbitrary point.

17. The non-transitory computer readable storage medium tangibly embodying the program of machine-readable instructions executable by the digital processing apparatus to perform the region extraction method according to claim 15, wherein the method further comprises, between the acquiring the image and the specifying the plurality of temporary initial regions in the acquired image:
specifying a plurality of points in the acquired image;
specifying a prescribed region centered at the specified point as the temporary initial region on each of the plurality of points; and
calculating the separation between the inside and outside of the temporary initial region on each temporary initial region specified on each of the plurality of points,
wherein the specifying an arbitrary point regards a center point of the temporary initial region having a largest separation calculated in the calculating the separation between the inside and outside of the temporary initial region as the arbitrary point.

* * * * *